United States Patent Office 2,757,275
Patented July 31, 1956

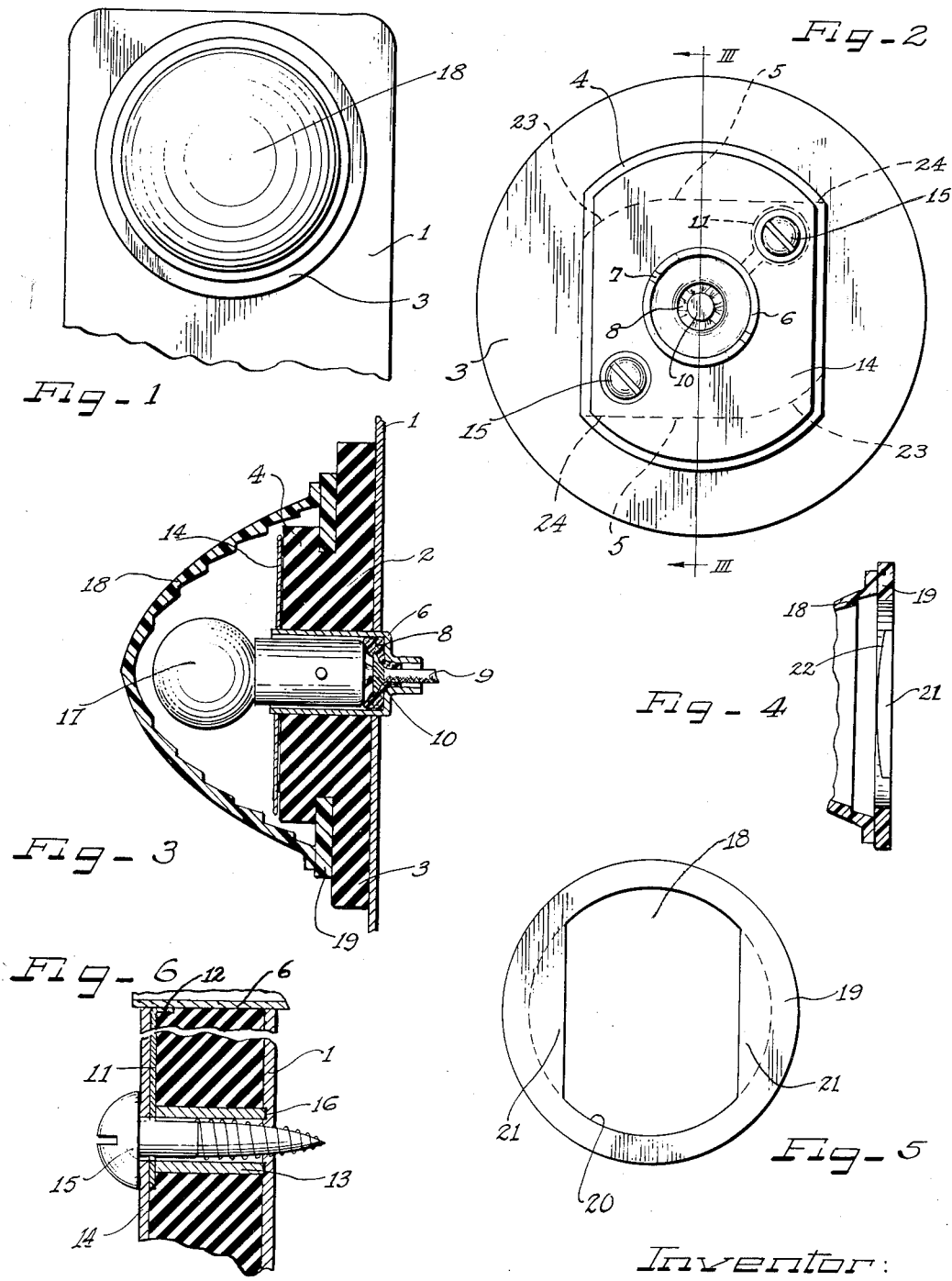

2,757,275
LIGHT ASSEMBLY
Paul D. Lehr, Chicago, Ill.

Application May 28, 1952, Serial No. 290,459

11 Claims. (Cl. 240—8.3)

This invention relates to improvements in a light assembly, and more particularly, to a light assembly for association with motor vehicles, the assembly being highly desirable for use as a clearance, stop, or tail light, on truck bodies, trailers, and the like, although the invention will have other uses and purposes as will be apparent to one skilled in the art.

In lights of the character of clearance, stop and tail lights utilized on trucks, trailers, and similar vehicles, it is customary to provide a wire leading from a source of current such as the battery, to the filament of the electrical bulb, while the other side of the filament is grounded to the body of the truck or trailer. In the past, many and various types of these lights have been developed, but have proven objectionable in that due to rust of the attaching means, or adjacent metallic parts, the ground connection was weakened, thereby resulting in the light dimming or going completely out. Further, in most cases of which I am aware, lights of this type heretofore made required the removal of one or more screws in order to remove and replace reflectors, globes, lenses, lens covers and the like, and electric bulbs. In cold weather, there is considerable danger of dropping and losing one of the screws, and if the screws are rusted sometimes it is virtually impossible to manipulate them. Servicing outside in cold weather, therefore, was in all cases highly difficult, and in some instances virtually impossible. In those instances heretofore where attempts were made to provide removable globes, lenses, lens covers and the like without the use of screws, the means holding the globes or lenses or the like were exposed to weather, were not waterproof, etc., did not take up vibration and shock as well as desired, and consequently the light would become defective, and in some cases impossible of repair due to those conditions.

With the foregoing in mind, it is an important object of the instant invention to provide a light assembly of the character set forth herein which, when mounted on a vehicle, provides a positive rustproof ground connection at all times, regardless of what parts of the structure may become rusty or weather beaten.

It is also an object of this invention to provide a light assembly for trucks, trailers, and the like, which is readily serviceable in all kinds of weather without the manipulation of screws and similar mounting elements, and without the use of any tools.

Also an object of this invention is the provision of a vehicle light assembly which in operative position, effectively prevents the entrance of water and dirt into the interior, and absorbs vibrations.

A further feature of the invention resides in the provision of a vehicle light assembly, wherein the globe or lens or the like is readily and easily replaced and removed merely by twisting it through a partial revolution, and when in place effectively seals dirt and moisture from the interior of the assembly.

Also a feature of the invention resides in the provision of a vehicle light assembly so constructed as to provide less shadow area than heretofore known, and one which reflects, passes and/or refracts light over the rear or side of the body upon which it is mounted.

Still a further feature of the invention is the provision of a highly efficient, long lived, and extremely economical vehicle light assembly.

While some of the more salient features, characteristics and advantages of the instant invention have been above pointed out, others will become apparent from the following disclosures, taken in conjunction with the accompanying drawing, in which—

Figure 1 is a fragmentary elevational view of a light assembly embodying principles of the instant invention showing the same in operative position upon a vehicle or the like;

Figure 2 is a front view of the light assembly alone of Fig. 1, with the globe or lens or transparent or translucent cover and electric bulb removed;

Figure 3 is a vertical sectional view through the assembly of Fig. 1, with parts shown in elevation, taken substantially as indicated by the section line III—III of Fig. 2;

Figure 4 is a fragmentary sectional view through the base portion of the globe or lens or transparent or translucent cover alone;

Figure 5 is an inside view of the reflector; and

Figure 6 is a fragmentary detail sectional view illustrating the ground connection.

As shown on the drawings:

The illustrated embodiment of the instant invention is shown mounted in operative position on a panel 1, which may be the side or back of a truck or trailer. The lamp assembly itself includes a base or block 2 of resilient material, such as rubber or synthetic rubber. In the illustrated instance, this block 2 is shown as molded of a single piece of material, as the most economical way of manufacture, but it will be understood that the block may be built up of several pieces or layers, if so desired, and will function in the same way even though thus fabricated.

The block 2 includes a circular base portion 3 of greater diameter than the remainder. Above the base portion is a part or extension 4, of generally rectangular shape, having arcuate edge portions. At the edge portions, the part or extension 4 is separated from the base 3 by undercuts or grooves 5—5 leading in from the respective arcuate end portions. The part or extension 4 may be integral with the base 3 with the arcuate edge portions being separated therefrom by inwardly extending undercuts 5—5 thereby defining a substantially rectangular portion of the block between the base 3 and the extension or part 4. As will more fully later appear, these slots or grooves provide a way of anchoring a lens or globe or the like to the block 2.

Extending centrally through the block 2 is a bulb receiving socket 6, provided with the well known bayonet slot connections at diametrally opposed points, as indicated at 7 in Fig. 2, through which the projecting pins on the base of a lamp bulb may enter. Inside the socket 6 is a cushion element 8 which is preferably of very highly resilient rubber, such as foam latex or sponge rubber, and this element is centrally apertured to accommodate a conductor 9 (Fig. 3) connected to a flared contact buton 10. The conductor 9 may, of course, lead from a suitable source of electrical energy, such as the battery of the vehicle.

Of course, the socket 6 must be positively grounded, and this is usually accomplished by connecting the socket 6 to the body of the vehicle by way of the panel 1. To this end, an eyelet contact leaf 11 is provided, having a shank portion turned downwardly as indicated at 12 in Fig. 6 between the socket 6 and the block 2. The free end of this eyelet extends outwardly over the top of a brass bushing 13 extending entirely through the block 2. This bushing is referred to as a brass bushing, to indicate that it is of some relatively highly conductive but rustproof material. Arranged over the face of the part 4 of the block 2 is a sheet metal element 14, apertured to accommodate the socket 6, and also apertured to accommodate a pair of screws 15—15. This plate rests on top of the respective bushing 13, there being one defining a passage for each of the screws 15, and in the case of one of the screws, rests on top of the aforesaid contact eyelet 11, as clearly seen in Fig. 6.

Consequently, upon tightening of the screws, which are threadedly engaged directly into the panel 1, the contact bushing 13 is forced into firm and positive contact with the panel 1. In fact, the inner end of the bushing 13 is preferably roughened as indicated at 16 in Fig. 6, so that when the screw 15 is tightened down, this bushing will bite through any coatings of paint or enamel, and bitingly engage the panel 1 so that there is a positive electrical contact at all times, whether or not the screw 15, the plate 14, or the panel 1 becomes rusty.

Now with reference to Fig. 3, it will be seen that a well known form of lamp bulb 17 may be entered into the socket 6. When the bulb is pressed into the socket so that the lugs on the sides thereof are engaged in the bayonet slots 7, the cushion element or plug 8 is compressed to a very material extent, and engages the wall of the socket 6 around the contact button 10 in a manner to effect a positive moistureproof seal. At the same time, this cushion element very effectively absorbs any vibrations or shocks that might adversely affect the lamp bulb.

Over the lamp bulb is a globe or lens or the like 18 ribbed or otherwise internally configured to brighten and spread the light. This globe or lens or the like may be made of any suitable transparent material, but is preferably a thermoplastic or thermosetting plastic material. Secured to the dome-like globe or lens or the like 18 in a manner to form substantially an integral structure is an annular base 19. This base is provided with an opening 20 therein of complemental shape to the upper part 4 of the block 2. The provision of this opening or aperture 20 provides a pair of inwardly extending side wings 21—21 forming the straight edges of the opening, and as seen clearly in Fig. 5, the inner side edge of the wings 21 is arcuate as indicated at 22 to facilitate the movement of the wings into the aforesaid grooves or slots 5—5 beneath the part or extension 4 of the block 2. Otherwise, the base 19 of the dome 18 is of substantially the same thickness as the width of the grooves 5—5, as clearly seen in Fig. 3.

Again, with reference to Fig. 2, it will be seen that the grooves 5—5 have opposed arcuate inside walls as indicated at 23—23 at opposite corners of the portion, part or extension 4, while at the other opposite corners, the groove terminates in an abrupt corner portion as indicated at 24. The distance from one corner 24 to the opposite corner 24 is greater than the distance between the inner edges of the wings 21—21 of the dome-like member such as a globe or lens or the like 18. Consequently, when the globe or lens or dome-like member or the like 18 is placed over the part or extension 4 of the block 2, it may readily be rotated clockwise as seen in Fig. 2, until the wings 21—21 engage flatly against the base of the slots 5—5 when brought into contact with the corner portions 24—24. Thus there is permitted substantially a quarter revolution of the globe or lens or dome-like member or the like 18, and the corner portions limit the movement of the globe or lens or dome member or the like 18 so that it cannot be turned too far. When the globe or lens or dome-like member or the like 18 is so mounted, it is positively engaged with the block 2, in a manner to seal out all dust and moisture.

In operation, it is a simple expedient when mounting the light assembly to secure the two screws 15—15 in the proper location on the vehicle panel 1. This automatically establishes a positive ground for the lighting circuit. The lamp bulb 17 may next be inserted in the usual manner in the socket 6, and as stated above, an effective water and dust tight seal is established by means of the cushion element 8 which also absorbs shocks and vibrations. Then it is a simple expedient to place the lens 18 in position, rotate it approximately 90°, and it is firmly locked in place. Should any injury occur to the lens 18 or lamp bulb, or should the latter burn out, it is a simple expedient to turn the reflector 90° in the opposite direction, remove it, replace the lamp bulb if necessary, and then replace the reflector in the manner above described. It will be especially noted that no tools whatever are necessary to remove and replace the lens 18, no holding parts are exposed when the lens 18 is in position to become injured by adverse weather conditions, and the reflector may readily be changed even in the coldest weather with facility. There is no need to loosen the screws 15—15 when making replacement of the lens 18 or lamp bulb 17. At all times, the light assembly is waterproof, weatherproof, and there is a positive ground with the vehicle body. It will also be noted that there is less shadow effect, that is, the light will reflect on a greater surface of the vehicle than lights of this character heretofore known, and when used in the manner of a stop light, will light up a considerable area of the back of a vehicle when the brakes are applied.

The entire structure is highly economical, durable, and readily and easily installed.

It will be understood that modifications and variations may be effected without departing from the scope of the novel concepts of the present invention.

I claim as my invention:

1. In a light assembly, a resilient block including a base part at one axial end thereof and another part of less size than said base part at the other axial end of said block, opposed edges of said other part being separated from the base part by an undercut groove, a bulb socket in said block to retain a lamp bulb in an operative position, and a dome-like member of light transmitting material to enclose a bulb in said socket and having an inwardly extending flange to interlock in said groove and seal against said base part.

2. In a light assembly, a resilient base block, a bulb socket in said block, said block having an aperture therethrough, a rustproof conductive bushing in said aperture, a mounting screw passing through said bushing to engage a grounding and supporting surface, and means connecting said bushing with said socket, whereby when said screw is tightened it will drive said bushing into contact with the grounding surface engaging the screw and grounding the socket.

3. In a light assembly, a resilient base block, a bulb socket in said block, said block having an aperture therethrough, a rustproof conductive bushing in said aperture, a mounting screw passing through said bushing to engage a grounding and supporting surface, and means connecting said bushing with said socket, whereby when said screw is tightened it will drive said bushing into contact with the grounding surface engaging the screw and grounding socket, said bushing having a rough inner edge to bite into said surface to provide a good grounding contact therewith.

4. In a light assembly, a resilient base block comprising a base seating portion at one axial end thereof, another portion of less size than the base seating portion at the other axial end of said base block, and opposed undercut grooves between opposed edges of said other portion and said base seating portion; a bulb socket in said base block between said grooves and disposed to retain a bulb operatively in position adjacent to said other portion of said base block; a dome-like member of light transmitting material to cover a bulb in said socket, and wings on said member to interlock in said grooves.

5. In a light assembly, a resilient base block comprising a base seating portion at one axial end thereof, another portion of less size than the base seating portion at the other axial end of said base block, and opposed undercut grooves between opposed edges of said other portion and said base seating portion; a dome-like member of light transmitting material having a dome portion, a base portion, and inwardly extending wings on the base portion to interlock in said grooves to enclose said other portion of said base block; and a bulb socket in said base block to position a lamp bulb to be enclosed by said dome-like member.

6. In a light assembly, a resilient base block comprising a base seating portion at one axial end thereof, another portion of less size than the base seating portion at the other axial end of said base block, and opposed undercut grooves between opposed edges of said other portion and said base seating portion; a dome-like member of light transmitting material having a dome portion, a base portion, and inwardly extending wings on the base portion to interlock in said grooves to enclose said other portion of said base block; and a bulb socket in said base block to position a lamp bulb to be enclosed by said dome-like member; said wings each having an arcuate surface facing into said dome portion to facilitate entrance into said grooves.

7. In a light assembly, a resilient base block comprising a base seating portion at one axial end thereof, another portion of less size than the base seating portion at the other axial end of said base block, and opposed undercut grooves between opposed edges of said other portion and said base seating portion; a dome-like member of light transmitting material having a dome portion, a base portion, and inwardly extending wings on the base portion to interlock in said grooves to enclose said other portion of said base block; and a bulk socket in said base block to position a lamp bulb to be enclosed by said dome-like member; said wings having a thickness substantially equal to the width of said grooves to insure a tight sealing fit.

8. In a light assembly, a resilient base block comprising a base seating portion at one axial end thereof, another portion of less size than the base seating portion at the other axial end of said base block, and opposed undercut grooves between opposed edges of said other portion and said base seating portion; a dome-like member of light transmitting material having a dome portion, a base portion, and inwardly extending wings on the base portion to interlock in said grooves to enclose said other portion of said base block; and a bulb socket in said base block to position a lamp bulb to be enclosed by said dome-like member; said wings being interlocked in said grooves by relative rotational movement of said dome-like member with respect to said base block; and means in said grooves to limit such relative rotational movement.

9. In a light assembly, a resilient base block comprising a base seating portion at one axial end thereof, another portion thereof substantially rectangular in configuration and of less size than the base seating portion at the other axial end of said base block, opposed arcuate edges and opposed straight edges on said other portion, and opposed undercut grooves in said base block between said arcuate edges and said base seating portion respectively to define a substantially rectangular intermediate portion between said other portion and said base seating portion, said intermediate portion having a pair of rounded diagonally opposed corners and a pair of substantially right angular diagonally opposed corners; a lamp bulb socket in said base block; and a dome-like member of light transmitting material having an inwardly flanged base with an opening therein complementary to the other portion of the base block whereby flanges adjacent to the straight edges of the opening in the base of the dome-like member may interlock in the grooves with the dome-like member substantially sealed against the base seating portion of the base block upon relative rotational movement between the dome-like member and the base block.

10. In a light assembly, a resilient base block comprising a base seating portion at one axial end thereof, another portion of less size than the base seating portion at the other axial end of said base block, opposed undercut grooves between opposed edges of said other portion and said base seating portion, a bulb socket in said base block between said grooves and disposed to retain a bulb operatively in position adjacent to said other portion of said base block, a dome-like member of light transmitting material to cover a bulb in said socket, wings on said member to interlock in said grooves, apertures through said base block for attachment means, mounting screws passed through said apertures to engage a mounting panel, rustproof contact means forced against the mounting panel by said screws, and said contact means being connected to said socket.

11. In a light assembly, a resilient base block comprising a base seating portion at one axial end thereof, another portion of less size than the base seating portion at the other axial end of said base block, opposed undercut grooves between opposed edges of said other portion and said base seating portion, a dome-like member of light transmitting material having a dome portion, a base portion, and inwardly extending wings on the base portion to interlock in said grooves to enclose said other portion of said base block, a bulk socket in said base block to position a bulb to be enclosed by said dome-like member, said wings being interlocked in said grooves by relative rotational movement of said dome-like member with respect to said base block, means in said grooves to limit such relative rotational movement, said base block having an aperture therethrough, a rustproof conductive bushing in said aperture, a mounting screw passing through said bushing to engage a grounding and supporting surface, means connecting said bushing with said socket, whereby when said screw is tightened it will drive said bushing into contact with the grounding surface engaging the screw and grounding the socket, said bushing having a rough inner edge to bite into said surface to provide a good grounding contact therewith.

References Cited in the file of this patent

UNITED STATES PATENTS

| | | |
|---|---|---|
| 2,024,858 | Highfill | Dec. 17, 1935 |
| 2,141,240 | Dover | Dec. 27, 1938 |
| 2,195,189 | Sauer | Mar. 26, 1940 |
| 2,208,154 | Daehler | July 16, 1940 |
| 2,208,155 | Daehler | July 16, 1940 |
| 2,415,902 | Noel | Feb. 18, 1947 |
| 2,484,558 | Eisner | Oct. 11, 1949 |
| 2,697,210 | DelCamp | Dec. 14, 1954 |

FOREIGN PATENTS

| | | |
|---|---|---|
| 639,338 | France | Mar. 6, 1928 |